United States Patent [19]

Fischer

[11] 4,211,049
[45] Jul. 8, 1980

[54] ARRANGEMENT FOR AND A METHOD OF ANCHORING A MOUNTING ELEMENT IN A HOLE OF A SUPPORT STRUCTURE

[76] Inventor: Artur Fischer, Weinhalde 34, D-7244 Waldachtal 3, Fed. Rep. of Germany

[21] Appl. No.: 951,660

[22] Filed: Oct. 16, 1978

[30] Foreign Application Priority Data

Oct. 15, 1977 [DE] Fed. Rep. of Germany ....... 2746482

[51] Int. Cl.² .......................... E04B 1/41; F16B 39/00
[52] U.S. Cl. ......................................... 52/704; 52/744
[58] Field of Search ................. 52/704, 705, 708, 707, 52/744; 405/260, 261

[56] References Cited

U.S. PATENT DOCUMENTS

| 2,930,199 | 3/1960 | Jarund | 405/260 |
|---|---|---|---|
| 3,283,513 | 11/1966 | Kierans | 405/260 |
| 3,492,827 | 2/1970 | Stevens | 52/744 |
| 3,572,956 | 3/1971 | Liscum | 52/744 |
| 4,044,512 | 8/1977 | Fischer | 52/704 |
| 4,050,202 | 9/1977 | Fischer et al. | 52/704 |
| 4,063,582 | 12/1977 | Fischer | 52/704 |

Primary Examiner—Reinaldo P. Machado
Attorney, Agent, or Firm—Michael J. Striker

[57] ABSTRACT

A mounting element is anchored in a hole of a support structure by use of a hardenable binder material. The latter is fed from a feeding device which has an outlet section insertable into the hole. The outlet section of the feeding device has a volume which corresponds to that of parts of the mounting element to be inserted into the hole. Thereby only enough binder material can enter the hole to anchor the mounting element so that the expulsion of excess binder material from the hole upon introduction of the mounting element is prevented. A ring-shaped member may be fitted onto the mounting element to center and fix the latter in the hole. The ring-shaped member may be inserted into the hole before or after injecting the hardenable binder material into the latter.

9 Claims, 3 Drawing Figures

ARRANGEMENT FOR AND A METHOD OF ANCHORING A MOUNTING ELEMENT IN A HOLE OF A SUPPORT STRUCTURE

BACKGROUND OF THE INVENTION

The present invention relates to an arrangement for and a method of anchoring a mounting element in a hole of a support structure, such as masonry or the like, by use of a hardenable binding material.

It is known to fill a hole drilled in a support structure by a hardenable binding material, and thereafter to introduce a mounting element into the hole wherein the mounting element is anchored when the binding material is hardened. However, the excessive portions of the hardenable material are always forced out from the hole during insertion of the mounting element into the latter, whereby the outer surface of the support structure is soiled. Moreover, since the outer diameter of the mounting element is smaller than the diameter of the hole, it is necessary to hold the mounting element until the binding material is hardened to obtain aligning mounting points.

In order to eliminate the above-mentioned disadvantages, it has been proposed to fix the mounting element in the hole by a ring-shaped member which is fitted on the mounting element and located in a gap between the outer surface of the latter and the wall of the hole. The hardenable binding material is then introduced into the hole through the tubular mounting element or through a filling opening provided in the ring-shaped member. However, since the filling opening for the binding material must have a cross-section which does not fall below a certain value, this method of anchoring requires to provide mounting holes having significant diameters.

SUMMARY OF THE INVENTION

Accordingly, it is an object of the present invention to provide an arrangement for and a method of anchoring a mounting element in a hole of a support structure, which avoids the diadvantages of the prior art.

More particularly, it is an object of the present invention to provide an arrangement for and a method of anchoring a mounting element in a hole of a support structure by use of a hardenable binding material, wherein the mounting element is fixed in a hole by a ring-shaped member and, at the same time, can be anchored in a hole having a substantially small diameter, without outflow of the binding material from the hole.

In keeping with these objects and with others which will become apparent hereinafter, one feature of the present invention resides, briefly stated, in an arrangement for anchoring a mounting element in a hole of a support structure, whose feeding device has an outlet section insertable into the hole of the support structure and having a volume which corresponds to the volume of a portion of the mounting element insertable into the hole. A method of anchoring in accordance with the present invention includes the step of introducing the feeding device into the mounting hole so that the outlet section of the former fills the volume corresponding to the volume of the above-mentioned insertable portion of the mounting element.

When anchoring of the mounting element is performed in accordance with the present invention, a mounting element can be anchored in holes having the smallest possible diameters corresponding only to the diameter of the outlet section of the feeding device. The outlet section of the feeding device, being inserted in the hole, fills a part of the hole whose volume corresponds to the volume of the portion of the mounting element to be thereafter inserted into the same hole. Then the hardenable binding material is injected into the mounting hole, but the above-mentioned part of the hole in which the outlet section of the feeding device is accommodated, is not filled by the binding material. When thereupon the insertable portion of the mounting element is inserted into the hole, the binding material is so distributed in the latter that, on the one hand, full enveloping of the mounting element is guaranteed, and, on the other hand, the outflow of the binding material from the hole is eliminated. This effect always takes place even when the drilled holes have different depths, and different quantities of the binding material are utilized for anchoring identical mounting elements.

A ring-shaped member may be fitted on the mounting element so as to center and fix the latter in the hole of the support structure during hardening of the binding material. Simultaneously, the ring-shaped member closes the hole and therefore prevents an outflow of the binding material from the hole during the hardening step especially when the mounting element is to be anchored in holes which are formed in ceilings or vertically extending walls. The ring-shaped member may be inserted into the hole together with the insertable portion of the mounting element, after introducing the binding material into and withdrawing the feeding device from the hole. In this case the volume of the insertable outlet section of the feeding device must correspond to the total volume of the ring-shaped member and the above-mentioned insertable portion of the mounting element. This embodiment is preferably utilized when the holes have a substantially small diameter. In this case the prevention of the outflow of the binding material from the hole is basically possible inasmuch as, when the feeding device is withdrawn from a small hole still sufficient time remains for inserting the mounting element together with the ring-shaped member into the hole.

When the hole is large, the premature outflow of the binding material can be prevented by inserting the ring-shaped member prior to the injection of the binding material. Thereafter the feeding device can be set onto a central passage of the ring-shaped member so that the outlet section of the feeding device extends through this passage into the hole of the support structure. After withdrawing the feeding device, the insertable portion of the mounting element is inserted into the hole through the passage of the ring-shaped member. This is possible, of course, under the condition that the mounting element is movably received into the ring-shaped member and can be inserted into the latter from the leading end of the mounting element. In the latter-mentioned case, the volume of the insertable outlet section of the feeding device must correspond only to the volume of the portion of the mounting element which is inserted into the hole through the passage of the ring-shaped member.

In accordance with a further feature of the present invention, the outlet section of the feeding device has a ventilating groove provided on an outer circumferential portion of this section and extending lengthwise of the latter. The ventilating groove prevents formation of air pockets, which is especially important in the cases when the outer diameter of the outlet section exactly matches the diameter of the hole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
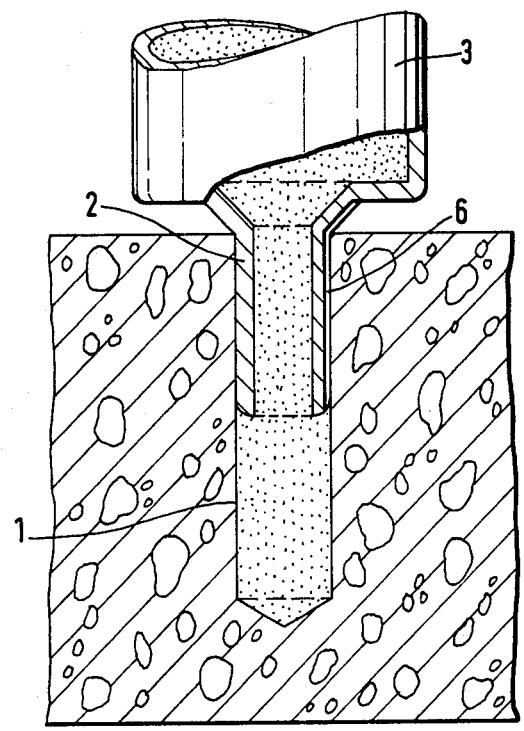
FIG. 1 is a view showing a portion of a feeding device whose outlet section is inserted in a hole of a support structure so as to inject binding material into the hole.

As shown in the drawing, in order to anchor a mounting element in a support structure a feeding device 3 is utilized. It has an outlet section formed as a mouthpiece 2 and insertable into the hole 1 of the support structure to inject a hardenable binding material into the hole.

Figure 2:
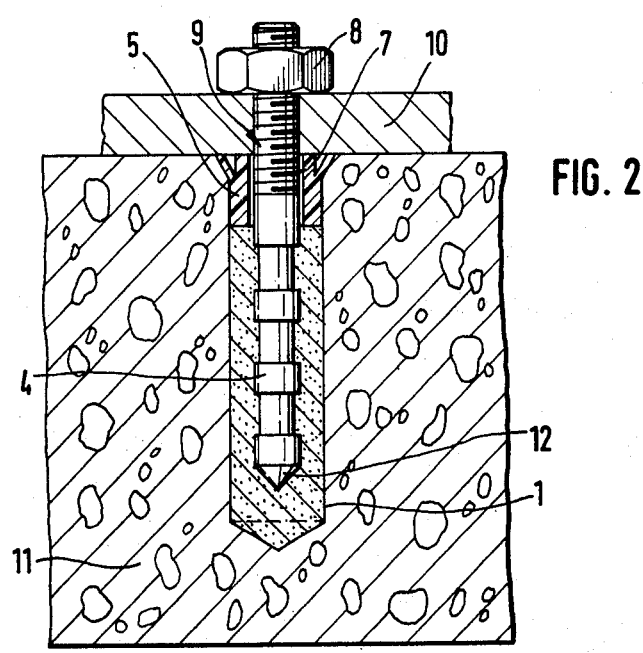
FIG. 2 is a view showing a mounting element which is anchored in the hole of the support structure.

As shown particularly in FIG. 1, the hole 1 has a diameter which corresponds to the diameter of the outlet section 2 of the feeding device 3. The outlet section 2 of the feeding device is here directly inserted in the hole 1 prior to insertion of the mounting element or other parts into the latter, and seals the hole 1. As shown in FIG. 2, the mounting element identified by reference numeral 4 is provided with a ring-shaped member 5. The ring-shaped member 5 is fitted onto the mounting element 4 and inserted into the hole 1 together with the latter. In this case, the outlet section 2 of the feeding device 3 has a volume which corresponds to the total volume of the ring-shaped member 5 and a portion of the mounting element 4 which is inserted into the hole 1 for the purposes which will be explained hereinbelow. In order to prevent formation of air pockets in the hole 1, the outlet section 2 of the feeding device 3 is provided with a ventilating groove 6 which is formed on an outer circumferential surface of the outlet section 2, extends lengthwise of the outlet section 2 and is open outside of the support structure.

In operation, the feeding device 3 injects the hardenable binding material into the hole 1 of the support structure through the outlet section 2. Since the outlet section 2 of the feeding device has the volume corresponding to the volume of the parts to be thereupon inserted into the hole, e.g., the volumes of the ring-shaped member 5 and the insertable portion of the mounting element 4, the above-mentioned section 2 blocks such a volume of the hole which also corresponds to the volumes of these parts. Therefore, the hardenable binding material fills only the remainder of the hole 1. After this, the feeding devices 3 is withdrawn and the mounting element 4 together with the ring-shaped member 5 are inserted into the hole 1 which is partially filled by the binding material. The hardenable binding material admitted into the hole during the previous step, is displaced by the above-mentioned inserted parts, but does not outflow from the hole. The outflow of the binding material is eliminated inasmuch as the volume of the parts inserted into the hole 1 together with the volume of the binding material admitted into the hole before the insertion, does not exceed the total volume of the hole. The ring-shaped member 5 centers the mounting element 3 in the hole 1 and fixes the latter in the centered position. In addition, the ring-shaped member 5 closes the hole 1 and thereby further guarantees that the binding material does not outflow from the hole 1, even when the latter is formed in ceilings or vertically extending walls. The ring-shaped member 5 is also provided with a ventilating groove 7.

The mounting element 4 is formed as a stud bolt and has a threaded portion 9 arranged at a trailing end and extending outwardly beyond the hole 1, and a pointed tip provided at a leading end. After hardening of the binding material in the hole, an object 10 is fitted onto the threaded portion 9 of the mounting element 4, and a nut 8 is screwed onto the threaded portion 9 so as to secure the object 10 to the support structure. The mounting element 4 may also be formed as a tubular threaded sleeve with a flattened leading end.

Figure 3:
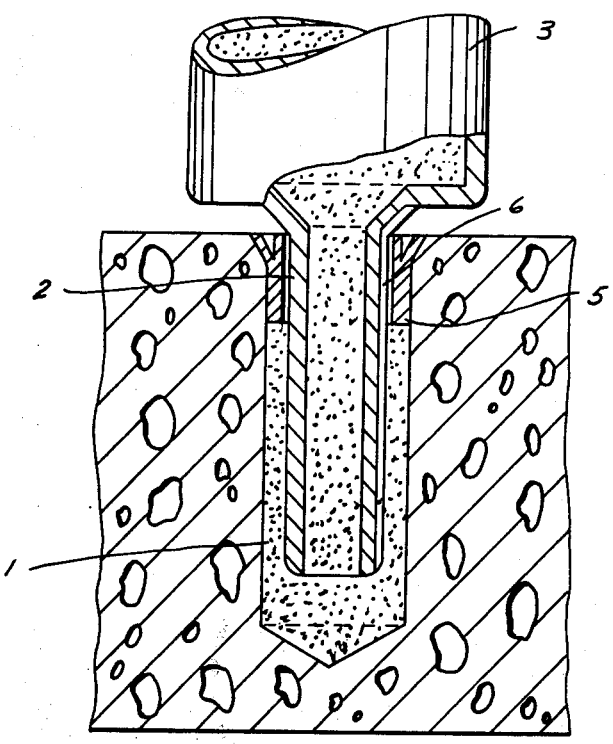
FIG. 3 is a view substantially corresponding to FIG. 1, but showing another embodiment of the present invention.

It is also possible to insert the ring-shaped member 5 into the mounting hole 1 prior to injection of the binding material into the latter as shown in FIG. 3. This is preferable in the cases when the mounting holes have a substantially large diameter. The previously inserted ring-shaped member overlaps a significant cross-section of the hole and prevents the outflow of the binding material when the feeding device is withdrawn from the hole. When the ring-shaped member 5 is inserted into the mounting hole 1, the outlet section 2 of the feeding device 3 is introduced through a central passage of the ring-shaped member 5 into the mounting hole, and the binding material is injected into the latter. After withdrawal of the feeding device, the mounting element 4 is inserted into the hole through the above-mentioned passage of the ring-shaped member. In such a case, the outlet section 2 of the feeding device 3 must have a volume which corresponds only to the volume of the portion of the mounting element which is to be inserted into the hole through the passage of the ring-shaped member.

It will be understood that each of the elements described above, or two or more together, may also find a useful application in other types of constructions differing from the types described above.

While the invention has been illustrated and described as embodied in an arrangement for and a method of anchoring a mounting element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an arrangement for anchoring a mounting element in a hole of a support structure by use of a hardenable binding material, a combination comprising a feeding device having an outlet section which is insertable into the hole of the support structure so as to introduce the hardenable binder material into the latter, and thereafter withdrawable from the hole; and a mounting element having a portion which is insertable into the hole after withdrawing said outlet section of said feeding device from the hole, so as to be anchored in the hole when the binding material is hardened in the latter, said insertable portion of said mounting element having a predetermined volume, and said insertable outlet section of said feeding device having a volume which corresponds to the volume of said insertable portion of said mounting element so that due to the presence of said insertable portion only enough binder material can enter the hole to anchor the mounting element, whereby the expulsion of excess binder material from the hole upon introduction of said mounting element is prevented.

2. A combination as defined in claim 1, wherein said outlet section is formed as a mouthpiece.

3. A combination as defined in claim 1, wherein said insertable portion of said mounting element includes a body section, and a ring-shaped section fitted on said body section and insertable into the hole together with said body section after introducing the hardenable binding material into the hole, said ring-shaped section being arranged for centering and fixing said mounting element in the hole, said outlet section of said feeding device having a volume corresponding to that of said body section together with said ring-shaped section.

4. A combination as defined in claim 3, wherein the hole has a predetermined diameter, said outlet section of said feeding device having a diameter corresponding to the diameter of the hole.

5. A combination as defined in claim 1; and further comprising a ring-shaped member insertable into the hole prior to introducing the hardenable binding material into the latter, said ring-shaped member having a through opening through which said outlet portion of said feeding device extends into the hole to introduce the hardenable binding material into the latter and through which, after withdrawing said feeding device, said mounting element extends into the hole so as to be centered and fixed in the latter.

6. A combination as defined in claim 5, said opening of said ring-shaped member has a predetermined diameter, said outlet section of said injecting device having a diameter corresponding to the diameter of said opening.

7. A combination as defined in claim 1, wherein said outlet section of said feeding device has an outer circumferential surface and a ventilating groove formed in said surface.

8. A combination as defined in claim 7, wherein said outlet section of said feeding device is elongated, said ventilating groove extending in the direction of elongation of said outlet section.

9. In an arrangement for anchoring a mounting element in a hole of a support structure by use of a hardenable binding material, a combination comprising a feeding device having an outlet section insertable into the hole for introducing the hardenable binding material into the latter, and thereafter withdrawable from the hole; the mounting element partially insertable into the mounting hole after withdrawing said outlet section of said feeding device from the latter, so as to be anchored in the hole when the binding material is hardened; and a ring-shaped member also insertable into the hole so as to close the latter and, at the same time, to center and fix said mounting element in the hole, said insertable outlet section of said feeding device having a volume corresponding to the volume of parts which are inserted into the hole after introducing the binding material thereinto.

* * * * *